(12) United States Patent
Franke et al.

(10) Patent No.: US 11,884,350 B2
(45) Date of Patent: Jan. 30, 2024

(54) METHOD FOR DETECTION OF AN OBJECT NEAR A ROAD USER

(71) Applicant: Joynext GmbH, Dresden (DE)

(72) Inventors: Lars Franke, Dresden (DE); Mathias Haberjahn, Dresden (DE)

(73) Assignee: Joynext GmbH, Dresden (DE)

( * ) Notice: Subject to any disclaimer, the term of this patent is extended or adjusted under 35 U.S.C. 154(b) by 0 days.

(21) Appl. No.: 17/994,440

(22) Filed: Nov. 28, 2022

(65) Prior Publication Data

US 2023/0182843 A1 Jun. 15, 2023

(30) Foreign Application Priority Data

Dec. 9, 2021 (DE) .......................... 102021132466.1

(51) Int. Cl.
*H04N 5/44* (2011.01)
*B62J 6/24* (2020.01)
(Continued)

(52) U.S. Cl.
CPC ................. *B62J 6/24* (2020.02); *B60W 40/04* (2013.01); *B60W 50/14* (2013.01); *B62J 50/22* (2020.02);
(Continued)

(58) Field of Classification Search
CPC ................. B60W 40/04; B60W 50/14; B60W 2050/146; B60W 2300/36;
(Continued)

(56) References Cited

U.S. PATENT DOCUMENTS

| 9,120,484 | B1 | 9/2015 | Ferguson et al. |
| 2015/0228066 | A1* | 8/2015 | Farb ....................... G06V 20/58 |
| | | | 348/148 |

(Continued)

FOREIGN PATENT DOCUMENTS

| DE | 10207201538 A1 | 3/2018 |
| DE | 102018221054 A1 | 6/2020 |
| DE | 112020001649 T5 | 4/2022 |

OTHER PUBLICATIONS

Office Action in DE 102021132466.1 dated May 12, 2022.
Office Action in DE 102021132466.1 dated Aug. 9, 2022.

*Primary Examiner* — Munear T Akki
(74) *Attorney, Agent, or Firm* — Manelli Selter PLLC; Edward Stemberger

(57) ABSTRACT

The invention relates to a method for detecting an object (303, 304) in the vicinity of a road user. The method recognizes objects (303, 304) detected by the sensor unit (101) with the object recognition unit (102) of a device (100), stores detected objects (303, 304) in an object list with the memory unit (103), transfers the object list with the transfer unit (104) to a data cloud (306), determines a position of the first road user, transmits the position of the first road user to the data cloud (306), identifies an object (303, 304) near the first traffic participant in the data cloud (306) using the object list, transmits a position and an object type of the identified object (303, 304) from the data cloud (306) to a mobile device of the first road user and displays the object (303, 304) and its position on the mobile device of the first road user.

11 Claims, 3 Drawing Sheets

(51) Int. Cl.
  *B62J 50/22*    (2020.01)
  *B60W 40/04*    (2006.01)
  *B60W 50/14*    (2020.01)

(52) U.S. Cl.
  CPC ... *B60W 2050/146* (2013.01); *B60W 2300/36* (2013.01); *B60W 2420/42* (2013.01); *B60W 2420/52* (2013.01); *B60W 2554/402* (2020.02); *B60W 2554/4041* (2020.02); *B60W 2554/4044* (2020.02); *B60W 2556/45* (2020.02)

(58) Field of Classification Search
  CPC ......... B60W 2420/42; B60W 2420/52; B60W 2554/4041; B60W 2554/4044; B60W 2556/45; B62J 50/22
  See application file for complete search history.

(56) References Cited

U.S. PATENT DOCUMENTS

| | | | | |
|---|---|---|---|---|
| 2017/0160392 | A1* | 6/2017 | Brisimitzakis | G01S 7/24 |
| 2018/0222473 | A1* | 8/2018 | Shami | B60W 50/14 |
| 2020/0211216 | A1* | 7/2020 | Hagio | G06T 7/248 |
| 2022/0388528 | A1* | 12/2022 | Sakagawa | G08G 1/164 |

* cited by examiner

METHOD FOR DETECTION OF AN OBJECT NEAR A ROAD USER

The invention relates to a method for detecting an object in the vicinity of a road user.

In particular, the invention is aimed at detecting an object in the vicinity of a road user that is not perceived by the road user, for example because there is another object between the road user and the object that obscures the road user's view of the object, or because of darkness or visibility conditions that are limited due to weather conditions, for example fog.

An object in the vicinity of a road user that is not perceived by the road user can pose a danger to the road user and/or to the object, especially if the road user and the object are moving towards each other or the road user is moving towards the object or the object is moving towards the road user.

BACKGROUND

Newer automobiles often have sensors that can detect objects in the vicinity of an automobile. Such sensors include cameras, radar sensors, lidar sensors and ultrasonic sensors. However, not all automobiles have such sensors. Furthermore, even these sensors cannot always detect all objects in the vicinity of an automobile. Other vehicles, such as two-wheeled vehicles, have much smaller numbers and degrees of sensors that detect objects in their vicinity. Bicycles in particular are not usually equipped with such sensors. However, bicyclists are particularly at risk in road traffic because bicycles do not have protective functions for their riders and a bicyclist is thus exposed to a significantly higher risk of injury in the event of a traffic accident than, for example, a vehicle occupant of an automobile. Equally unprotected are pedestrians. Bicyclists and pedestrians are also referred to as Vulnerable Road Users (VRU).

SUMMARY

The invention is based on the task of extending and improving the possibilities for detecting objects in the vicinity of a vulnerable road user (VRU).

The task is solved according to the invention with an device for detecting an object in the vicinity of a road user, in particular a vulnerable road user, which has the following functional units:
- a sensor unit, configured to detect objects in a vicinity of the road user,
- an object recognition unit, configured for object recognition of objects detected by the sensor unit,
- a memory unit, configured for storing recognized objects in an object list, and
- a transmission unit, configured for transmitting the object list, for example to a data cloud via a first radio link, in particular via a mobile radio link, and/or to a mobile device via a second radio link.

A mobile device, also referred to as a mobile terminal, is a terminal that can be carried by a user without much effort and can therefore be used on the move. Common mobile devices include cell phones, in particular smartphones, tablet computers and notebooks.

An device according to the invention enables the detection of objects in an environment of a road user by a sensor unit and the recognition of detected objects by an object recognition unit. Further, the device enables storage of detected objects in an object list by a storage unit and transmission of the object list to a data cloud by a transmission unit, either directly or via a mobile device that transmits the object list to the data cloud. In the data cloud, the object list, in particular together with other object lists, can be evaluated and used to identify objects in the environment of the road user. The information about objects in the environment of the road user determined in this way in the data cloud can be provided in the data cloud for multiple road users. In particular, an object in the vicinity of the road user can be identified in the data cloud and the position and object type of the identified object can be transmitted from the data cloud to a mobile device of the road user. In this way, the road user can be warned of a potentially dangerous situation in particular.

In another embodiment of the invention, the device can be arranged at a vehicle. For example, the vehicle is a two-wheeled vehicle, in particular a bicycle. Further, the device is arranged or disposable on or in a lighting device of the vehicle, for example.

The aforementioned embodiment of the invention makes it possible to equip and, in particular, retrofit a vehicle with the device. The arrangement of the device on or in a lighting device of the vehicle is advantageous, since a power supply of the lighting device can also be used to supply power to the functional units of the device. This means that no separate power supply needs to be provided for these functional units, or the connection of the lighting device to a power supply of the vehicle can also be used to connect the functional units of the device to the power supply of the vehicle.

In particular, a bicycle can also be equipped with an device. For example, an electric bike (e-bike), i.e. a bicycle with an electric motor, can be equipped with the device, whereby a drive battery of the electric bike can be used to supply power to the functional units of the device.

In another embodiment of the invention, the sensor unit of the device comprises a camera, a radar sensor, a lidar sensor and/or a radio module, for example a radio module of a V2X communication.

V2X communication is also referred to as Vehicle-to-Everything Communication, Car2X Communication or Car-to-X Communication and enables the exchange of information and data between a vehicle and other traffic participants of V2X communication in an environment of the vehicle. The communication between participants of V2X communication is usually done by radio signals. The radio signals are exchanged between the participants using, for example, ITS-G5/DSRC (abbreviation for Dedicated Short Range Communication) or in a mobile radio network, for example via PC5 or Uu interfaces.

In a further embodiment of the invention, the second radio connection via which the object list is transmitted to a mobile device is a Bluetooth connection, a WLAN connection or an NFC connection (NFC: abbreviation for Near Field Communication).

According to the invention, the task is further solved with a method for detecting an object in the vicinity of a first road user using an device according to the invention, which is carried by the first road user or a second road user. The method comprises the following steps:
- detecting objects in an environment of the first road user with the sensor unit of the device,
- recognizing objects detected with the sensor unit with the object recognition unit of the device, and
- storing recognized objects in an object list with the memory unit of the device.

In the method according to the invention, the sensor unit of an device according to the invention detects objects in the vicinity of a first road user. The device is carried along by the first road user or a second road user. In particular, the device is arranged, for example, on a vehicle of the road user carrying the device along, for example on or in a lighting device of the vehicle. Furthermore, the detected objects are recognized with the object recognition unit of the device and stored in an object list with the memory unit of the device. The advantages of the method according to the invention correspond to the above-mentioned advantages of an device according to the invention.

One embodiment of the method according to the invention comprises the following further steps:
  transmission of the object list with the transmission unit of the device into a data cloud,
  determining a position of the first road user,
  transmitting the position of the first road user into the data cloud,
  identifying an object in the vicinity of the first road user in the data cloud using the object list,
  transmitting a position and an object type of the identified object from the data cloud to a mobile device of the first road user, and
  displaying the object and its position on the mobile device of the first road user.

Thus, in the aforementioned embodiment of the method according to the invention, an object in the vicinity of the first traffic participant is identified in a data cloud. To make this possible, the object list is transferred to the data cloud and the position of the first road user is determined and transferred to the data cloud. Based on the object list and possibly other object lists transmitted to the data cloud by other road users, an object in the vicinity of the first road user is then identified in the data cloud. The position and object type of the identified object are transmitted from the data cloud to a mobile device of the first road user, and the object and its position are displayed on the mobile device of the first road user. In this way, the first road user can be alerted and warned in particular of an object in his vicinity that he has not noticed.

It is not necessary for the first road user to carry the device himself. Instead, the device can also be carried by a second road user and used to detect and recognize objects in the vicinity of the first road user and to create the object list. Of course, the device can alternatively also be carried along by the first road user. It is only essential that objects in the vicinity of the first road user are detected and recognized with an device according to the invention, which is carried along by any road user, an object list of these objects is created and the object list is then transferred to the data cloud in order to be able to be evaluated there.

In a further embodiment of the method according to the invention, the first road user is warned, in particular if a depicted object falls below a minimum distance from the first road user, and/or is located in a rear area of the first road user, and/or approaches the first road user at high speed. The warning is issued to the first road user acoustically, visually and/or haptic, for example by the mobile device of the first road user.

In a further embodiment of the method according to the invention, data is stored in the object list which describes for an object in each case the type of the object (object type), a position of the object and/or a speed and/or a direction of a movement of the object.

The position of an object can be used to determine in the data cloud how close the object is to the first road user. The speed and direction of an object's movement can be used to determine in the data cloud whether and how fast the object is approaching the first road user. The type of an object characterizes the object itself. For example, the type of an object describes whether the object is a vehicle and, if so, what type of vehicle the object is, or whether the object is a pedestrian or bicyclist, for example.

The position of the object can be described relative to the road user, for example. For example, the position of the object is described by a distance of the object from the road user and a direction in which the object is located as seen from the road user. For example, the direction is described by an angle in a coordinate system relative to the road user. The speed of the object can also be described relative to the road user, that is, as a relative speed between the object and the road user.

In a further embodiment of the method according to the invention, the object list is first transmitted from the transmission unit to a mobile device of the road user carrying the device. Then the object list is transmitted, for example via a mobile radio connection, from the mobile device of the road user carrying the device to the data cloud.

In a further embodiment of the method according to the invention, the position and the object type of the identified object are transmitted from the data cloud to the mobile device of the first road user via a mobile radio connection.

The aforementioned embodiments of the method according to the invention take into account that a cellular connection is usually required to communicate with a data cloud via a mobile device of a road user, since other communication networks are not universally available for this purpose.

BRIEF DESCRIPTION OF THE DRAWINGS

Embodiments of the invention are explained in more detail below with reference to drawings. Thereby show.

DETAILED DESCRIPTION OF EXAMPLE EMBODIMENTS

Figure 1:
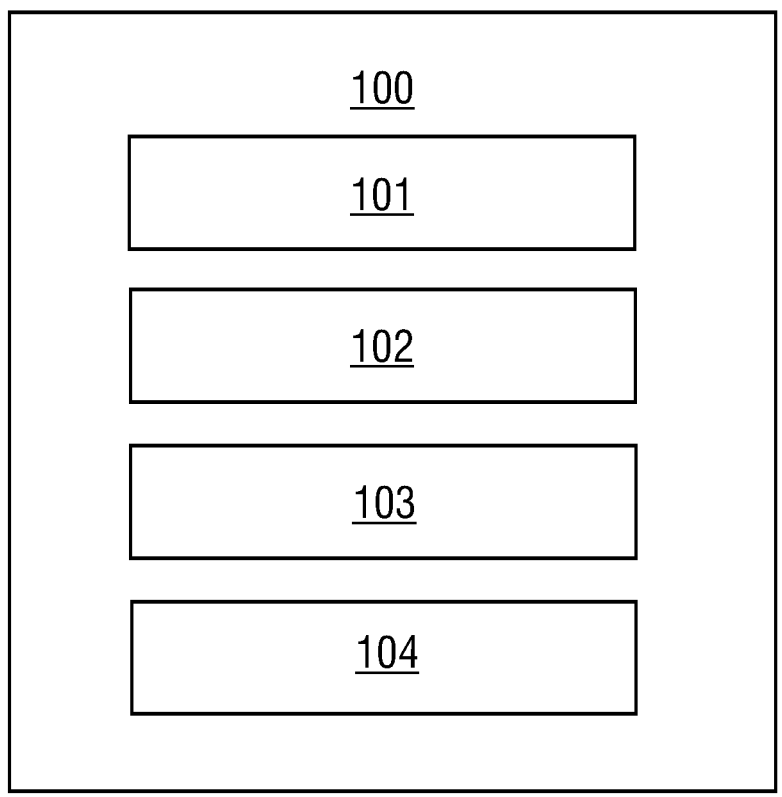
FIG. 1 is a block diagram of an embodiment of an device for detecting an object in the vicinity of a road user.

FIG. 1 shows a block diagram of an device 100 for detecting an object in the vicinity of a road user according to one embodiment of the invention. The device 100 has the following functional units shown in FIG. 1: a sensor unit 101, an object recognition unit 102, a memory unit 103, and a transmission unit 104.

The device 100 can be arranged on a vehicle, for example. The vehicle is, for example, a two-wheeled vehicle, in particular a bicycle. The device can be arranged, for example, on or in a lighting device or separately on the vehicle or, for example, integrated in the vehicle frame.

The sensor unit 101 is arranged to detect objects in an environment of the road user. For example, the sensor unit 101 has a camera, a radar sensor, a lidar sensor and/or a radio module of a V2X communication for this purpose.

The object recognition unit 102 is set up for object recognition of objects detected with the sensor unit 101. For example, the object recognition unit 102 is set up to evaluate sensor signals from a camera, a radar sensor, and/or a lidar sensor of the sensor unit 101 and/or radio signals from V2X communication.

The memory unit 103 is arranged to store detected objects in an object list. For example, the memory unit 103 is set up to store data in the object list that describes the type of object (object type), a position of the object and/or a speed and/or a direction of the object for each object. The position of the object and/or the speed and/or the direction of the object are thereby described relative to the road user, for example.

For example, the memory unit 103 has a non-volatile memory, which may be an EEPROM (Electrically Erasable Programmable Read-Only Memory). Alternatively, the memory unit 103 may also have another type of memory, for example a flash EEPROM or a hard disk. In particular, the memory unit 103 may have more than one of the aforementioned memories.

The transmission unit 104 is set up for transmitting the object list to a mobile device. For example, the transmission unit 104 is arranged to transmit the object list to the mobile device via a radio connection, in particular via a Bluetooth connection, a WLAN connection, or an NFC connection.

Figure 2:
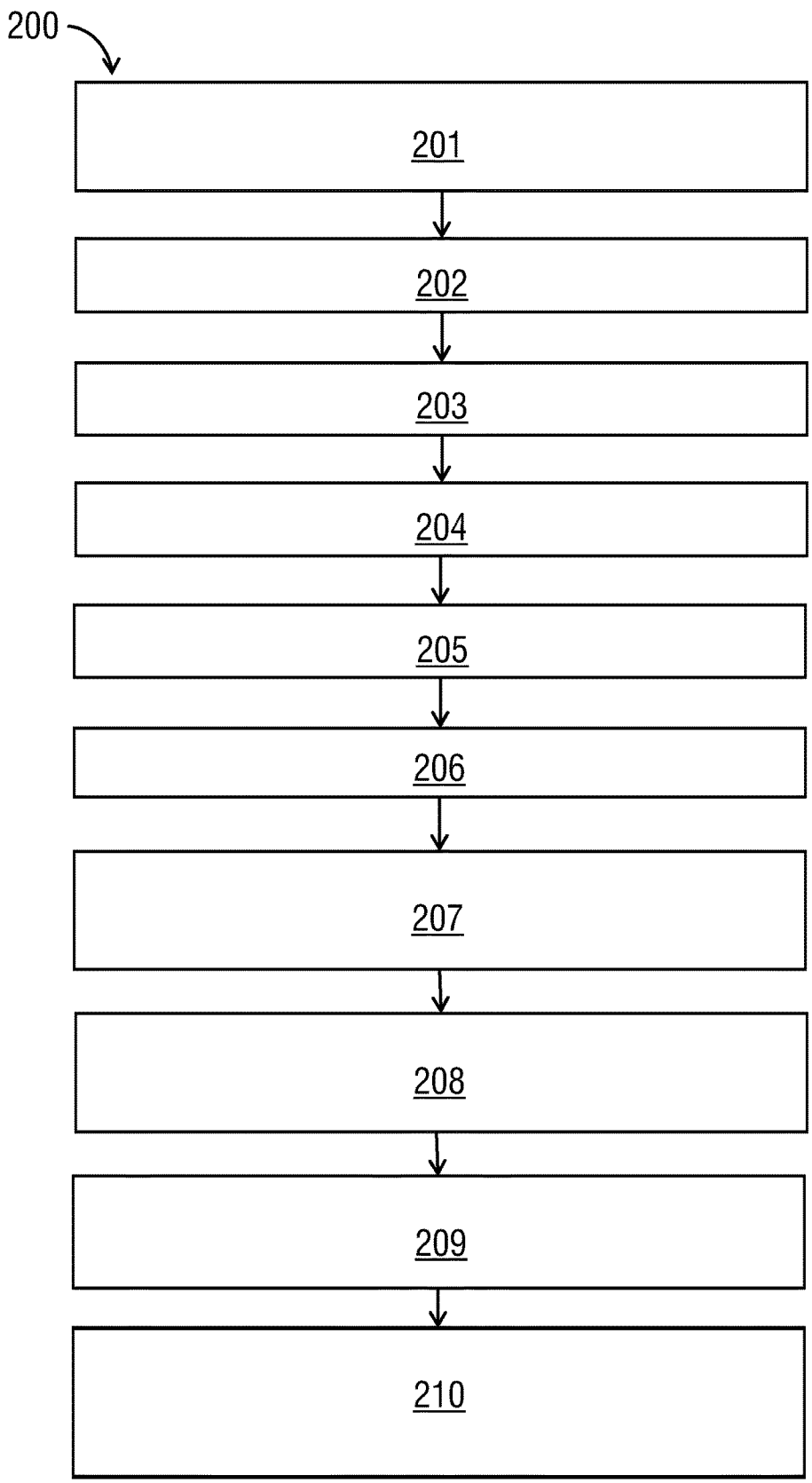
FIG. 2 is a flow chart of an embodiment of the process according to the invention.

FIG. 2 shows a flowchart 200 of a method comprising method steps 201 to 210 for detecting an object in the vicinity of a road user according to one embodiment of the invention. The method is carried out using an device 100 described with reference to FIG. 1.

The process steps 201 to 210 are also described below with reference to FIG. 3.

Figure 3:
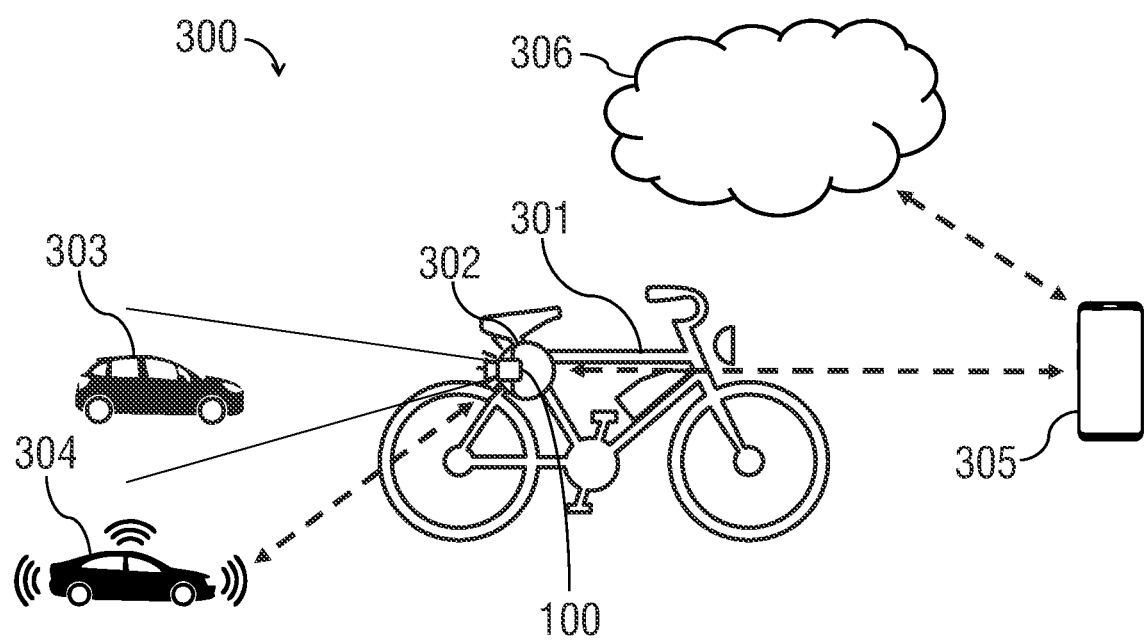
FIG. 3 shows the use of an device according to the invention on a vehicle.

FIG. 3. illustrates a use 300 of the device 100. The device 100 is arranged on a vehicle 301 of the road user. In the illustrated use 300 of the device 100, the vehicle 301 is an electric bicycle and the device 100 is arranged on a lighting device 302 of the electric bicycle, which comprises a rear light of the electric bicycle. The sensor unit 101 of the device 100 is used to detect objects 303, 304 in an environment of the road user. FIG. 3 shows an example of an object 303 detected by a camera, a radar sensor, or a lidar sensor of the sensor unit 101. Further, the sensor unit 101 has a radio module of a V2X communication, for example, a radio module for ITS-G5/DSRC or a PC5 interface. FIG. 3 shows an example of an object 304 with which the sensor unit 101 communicates via the radio module. The transmission unit 104 of the device 100 communicates with a mobile device 305 of the road user via a radio connection, for example via a Bluetooth connection, a WLAN connection or an NFC connection. The mobile device 305 communicates with a data cloud 306 via a cellular connection.

In a first method step 201, objects 303, 304 in an environment of the road user are detected with the sensor unit 101 of the device 100. For example, objects 303, 304 are detected with a camera, a radar sensor, a lidar sensor, and/or a radio module of a V2X communication of the sensor unit 101.

In a second method step 202, objects 303, 304 detected with the sensor unit 101 are recognized with the object recognition unit 102 of the device 100.

In a third method step 203, objects 303, 304 detected with the object detection unit 102 are stored in an object list with the storage unit 103 of the device 100. For example, data describing, for an object 303, 304, the object type of the object 303, 304, a position of the object 303, 304 and/or a velocity of the object 303, 304 and/or a direction of the object 303, 304, respectively, are stored in the object list.

In this regard, the position of the object 303, 304 may be described relative to the road user, for example. For example, the position of the object 303, 304 is described by a distance of the object 303, 304 from the road user and a direction in which the object 303, 304 is located as seen from the road user. The direction is thereby described, for example, by an angle in a coordinate system related to the road user. Also, the speed of the object 303, 304 can be described relative to the road user, that is, as a relative speed between the object 303, 304 and the road user.

In a fourth method step 204, the object list is transmitted with the transmission unit 104 of the device 100 to a mobile device 305 of the road user carried by the road user. For example, the object list is transmitted with the transmission unit 104 to the mobile device 305 via a radio connection, for example via a Bluetooth connection, a WLAN connection, or an NFC connection.

In a fifth method step 205, the object list is transferred from the mobile device 305 to a data cloud 306. For example, the object list is transferred from the mobile device 305 to the data cloud 306 via a cellular connection.

In a sixth method step 206, a position of the road user is determined. For example, the mobile device 305 comprises a position determination unit with which the position of the road user is determined. Alternatively, the device 100 comprises a position determination unit with which the position of the road user is determined.

The position of the road user is determined with the position determination unit using, for example, one or more navigation satellite systems, for example using GPS, GLONASS, Beidou and/or Galileo. In this case, the position determination unit has a receiver for satellite signals transmitted by navigation satellites of the navigation satellite systems. The position determination unit is used to obtain position coordinates from the satellite signals it receives, which represent a geographical position of the position determination unit.

In a seventh method step 207, the position of the road user is transmitted to the data cloud 306 using the road user's mobile device 305. In this process, if the position of the road user is not determined using a position determination unit of the mobile device 305, the position is first transmitted to the mobile device 305 and then transmitted from the mobile device 305 to the data cloud 306. For example, if the position of the road user is determined using a position determination unit of the device 100, the position is first transmitted to the mobile device 305 using the transmission unit 104 of the device 100.

In an eighth method step 208, an object 303, 304 in the vicinity of the road user is identified in the data cloud 306. For this purpose, the object list transferred to the data cloud 306 in the fifth method step 205 is used. Furthermore, additional object lists transferred to the data cloud 306 may be used in this process, for example object lists transferred to the data cloud 306 by other road users. If multiple object lists for objects 303, 304 in the environment of the road user are present in the data cloud 306, these object lists are fused in the data cloud 306, for example, to form an environment description of the environment of the road user, that is, the object lists are combined with each other to form a more comprehensive environment description. This environment description is then used in the data cloud 306 to identify an object 303, 304 in the vicinity of the road user.

In a ninth method step 209, a position and an object type of the object 303, 304 identified in the eighth method step 208 are transmitted from the data cloud 306 to the mobile device 305 of the road user. For example, the position and the object type of the identified object 303, 304 are transmitted from the data cloud 306 to the mobile device 305 of the road user via a cellular connection.

In a tenth method step 210, the object 303, 304 identified in the eighth method step 208 and its position are displayed on the mobile device 305 of the road user. In addition, the road user can be warned acoustically, visually and/or haptic, for example if the object 303, 304 falls below a minimum distance from the road user, and/or is located in a rear area of the road user and/or is approaching the road user at high speed.

The embodiment of the method according to the invention described above with reference to FIGS. 2 and 3 may be modified to an alternative embodiment of the method according to the invention in which an object 303, 304 in the vicinity of a first road user is identified using an object list created with an device 100 carried by a second road user and transmitted to the data cloud 306 with a mobile device of the second road user.

In this alternative embodiment of the method according to the invention, the method steps 201 to 205 are carried out with the device 100 carried by the second road user and the mobile device of the second road user. Thus, objects 303, 304 in the vicinity of the first road user with the device 100 carried by the second road user are detected, recognized and stored in an object list. This object list is transmitted to the mobile device of the second road user and from the mobile device of the second road user to the data cloud 306.

The further method steps 206 to 210 are then carried out in accordance with the first embodiment of the method according to the invention. Here, in method steps 206 and 207, a position of the first road user is determined and transferred to the data cloud 306, the position of the first road user being determined, for example, using a position determination unit of a mobile device of the first road user. In the method step 208, analogously to the first embodiment of the method according to the invention, an object 303, 304 in the vicinity of the first road user is identified in the data cloud 306. In the method step 209, the position and the object type of the object identified in the method step 208 are transmitted from the data cloud 306 to the mobile device of the first road user. In the method step 210, the object 303, 304 identified in the eighth method step 208 and its position are displayed on the mobile device 305 of the first road user, and a warning is generated for the first road user. In the second embodiment of the method according to the invention, the first road user thus does not need to carry the device 100 himself.

LIST OF REFERENCE NUMBERS

100 Device
101 Sensor unit
102 Object detection unit
103 Memory unit
104 Transmission unit
200 Flowchart
201 to 210 Procedure step
300 Use of a device
301 Vehicle
302 Lighting device
303, 304 Object
305 Mobile device
306 Data cloud

The invention claimed is:

1. Method for recognizing an object in the vicinity of a first road user using a device for recognizing the object which is carried along by the first or a second road user, the device comprising a sensor unit configured to detect objects in a vicinity of the road user, an object recognition unit configured for object recognition of objects detected with the sensor unit, a memory unit configured for storing recognized objects in an object list, and a transmission unit configured for transmitting the object list, the method comprising the step of:

detecting objects in an environment of the first road user with the sensor unit of the device,
recognizing the objects detected by the sensor unit with the object recognition unit of the device,
storing data regarding the detected objects in the object list with the memory unit of the device,
transferring the object list with the transfer unit of the device to a data cloud,
determining a position of the first road user,
transmitting the position of the first road user to the data cloud,
identifying the object near the first road user in the data cloud using the object list,
transmitting the position and an object type of the identified object from the data cloud to a mobile device of the first road user; and
displaying the object and its position on the mobile device of the first road user,
wherein the device is arranged at a bicycle,
wherein the mobile device is a smartphone, or a tablet or notebook computer and the transmission unit communicates with the mobile device via a Bluetooth link, or a WLAN link.

2. The method according to claim 1, wherein the device is arranged at or in a lighting device of the bicycle.

3. The method according to claim 1, wherein the sensor unit of the device comprises a camera, a radar sensor, a lidar sensor and/or a radio module.

4. The method according to claim 1, wherein the transmission unit of the device is constructed and arranged for transmitting the object list to the data cloud via a first radio link, in particular via a mobile radio link.

5. The method according to claim 1, wherein the transmission unit of the device is constructed and arranged for transmitting the object list to a mobile device via a second radio link.

6. Method for recognizing an object in the vicinity of a first road user using a device for recognizing the object which is carried along by the first or a second road user, the device comprising a sensor unit configured to detect objects in a vicinity of the road user, an object recognition unit configured for object recognition of objects detected with the sensor unit, a memory unit configured for storing recognized objects in an object list, and a transmission unit configured for transmitting the object list, the method comprising the step of:

detecting objects in an environment of the first road user with the sensor unit of the device,
recognizing the objects detected by the sensor unit with the object recognition unit of the device,
storing data regarding the detected objects in the object list with the memory unit of the device,
transferring the object list with the transfer unit of the device to a data cloud,
determining a position of the first road user,
transmitting the position of the first road user to the data cloud,
identifying the object near the first road user in the data cloud using the object list,
transmitting the position and an object type of the identified object from the data cloud to a mobile device of the first road user; and
displaying the object and its position on the mobile device of the first road user, wherein the mobile device is a smartphone, or a tablet or notebook computer, wherein the transmission unit communicates with the mobile device via a Bluetooth link, or a WLAN link,
wherein the device is arranged at a bicycle.

7. The method according to claim 1, further comprising:
warning of the first road user, if a displayed object falls below a minimum distance from the first road user, and/or is located in a rear area of the first road user, and/or is approaching the first road user at high speed.

8. The method according to claim 1, wherein data describing, for the object, the type of the object, a position of the object, and/or a speed of the object and/or a direction of a movement of the object, respectively, is stored in the object list.

9. The method according to claim 8, wherein the object list is first transmitted from the transmission unit to a mobile device of the road user carrying the device.

10. The method according to claim 9, wherein the object list is transmitted to the data cloud from the mobile device of the road user carrying the device via a cellular connection.

11. The method according to claim 7, wherein the position and the object type of the identified object are transmitted from the data cloud to the mobile device of the first road user via a cellular connection.

\* \* \* \* \*